(12) United States Patent
Serebrin

(10) Patent No.: US 8,166,276 B2
(45) Date of Patent: Apr. 24, 2012

(54) TRANSLATE AND VERIFY INSTRUCTION FOR A PROCESSOR

(75) Inventor: Benjamin C. Serebrin, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 557 days.

(21) Appl. No.: 12/394,293

(22) Filed: Feb. 27, 2009

(65) Prior Publication Data

US 2010/0223447 A1    Sep. 2, 2010

(51) Int. Cl.
*G06F 12/00* (2006.01)

(52) U.S. Cl. .......................... 711/203; 711/206; 711/207

(58) Field of Classification Search .................. None
See application file for complete search history.

(56) References Cited

U.S. PATENT DOCUMENTS

2005/0071601 A1*    3/2005   Luick ............................ 711/206

OTHER PUBLICATIONS

David F. Bacon, et al., "A Real-Time Garbage Collector with Low Overhead and Consistent Utilization," POPL'03, Jan. 15-17, 2003, New Orleans, Louisiana, USA, ACM.

* cited by examiner

*Primary Examiner* — Shawn X Gu
(74) *Attorney, Agent, or Firm* — Lawrence J. Merkel; Meyertons, Hood, Kivlin, Kowert & Goetzel, P.C.

(57) ABSTRACT

In an embodiment, a first instruction is defined that comprises at least a first operand from which the execution core is configured to determine a virtual address and a second operand that specifies one or more translation attributes that exist in a page table entry that defines a translation for the virtual address. A processor executing the instruction translates the virtual address, verifies whether or not the translation attributes in the page table entry match the specified translation attributes, faults the first instruction responsive to failing to locate a translation for the virtual address, and responsive to locating a translation for the virtual address in the page table entry but with the translation attributes in the entry failing to match the specified translation attributes.

19 Claims, 5 Drawing Sheets

| Opcode 212 | Trans. Attr. Op. Specifier 214 | Virtual Addr. Op. Specifier(s) 216 | Phys. Addr. Op. Specifier 218 |

210

| 6 3 | | 5 2 | 5 1 | | | | | | | | 3 2 | |
|---|---|---|---|---|---|---|---|---|---|---|---|---|
| Available | | | Address | | | | | | | | | |

| 3 1 | | | | | 1 2 | 1 1 1 0 9 | 8 | 7 | 6 | 5 4 3 | 2 | 1 | 0 |
|---|---|---|---|---|---|---|---|---|---|---|---|---|---|
| Address | | | | | | AVL | | | | EPT Type | X | W | R |

| 6 3 | 6 2 | | | 5 2 | 5 1 | | | | | | 3 2 |
|---|---|---|---|---|---|---|---|---|---|---|---|
| NX | Available | | | | Address | | | | | | |

| 3 1 | | | 1 2 | 1 1 1 0 9 | 8 | 7 | 6 | 5 | 4 | 3 | 2 | 1 | 0 |
|---|---|---|---|---|---|---|---|---|---|---|---|---|---|
| Address | | | | AVL | G | PAT | D | A | PCD | PWT | U/S | R/W | P |

| Opcode 212 | Trans. Attr. Op. Specifier 214 | Virtual Addr. Op. Specifier(s) 216 | Phys. Addr. Op. Specifier 218 |

210

TRANSLATE AND VERIFY INSTRUCTION FOR A PROCESSOR

BACKGROUND

1. Field of the Invention

This invention is related to the field of processors and, more specifically to address translation in processors.

2. Description of the Related Art

Most modern processors implement address translation. Generally, user programs and even many operating systems (or large portions thereof) execute with address translation enabled. The addresses that are used by the programs are virtual addresses. The virtual addresses are translated to physical addresses that are actually transmitted to the system memory of a computer system that includes the processor, to access memory locations. Different programs in execution in the computer system may be protected from each other's memory accesses, since the mapping of each program's addresses to physical addresses can be controlled. For example, the same (numerical) virtual address generated in different programs can be assigned to different physical addresses, so that the programs access different physical memory. Additionally, a larger virtual memory can be made available to a given program than the actual physical system memory by using disk storage (or other secondary storage) to store less frequently used data from the system memory. The data can be moved back into the system memory when an access occurs.

Generally, if a program generates a virtual address for which there is no current translation, the processor takes a page fault and invokes a page fault handler. The page fault handler can read the corresponding data from secondary storage (if it has been paged out), allocate a physical page for the virtual address and update the translation data to map the virtual address to the physical page, or take other corrective action. A page is the unit of allocation and deallocation in the virtual memory mechanism. Pages are aligned to a page sized address in memory, and can vary in size in some translation mechanisms.

One way to take advantage of virtual addresses (and potentially other hardware virtualization features) is the virtual machine mechanism. Virtualization via a virtual machine has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Both the VMM and the guests are executed by the processor(s) included in the physical machine. Accordingly, switching between execution of the VMM and the execution of guests occurs in the processor(s) over time. Particularly, the VMM schedules a guest for execution, and a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Intercepting certain instructions in the guest causes a world switch to the VMM. Instructions are intercepted for a variety of reasons. For example, an instruction that reads privileged processor state can be intercepted to ensure that the VMM will permit the guest to access the state (or to permit the VMM to perform the access on behalf of the guest). In some cases, the VMM changes processor state from the value that the guest established or expects, and instructions which access the state are intercepted to permit the VMM to supply the expected state instead of the changed state. An instruction that writes privileged state or other processor/system state that the VMM desires to control can be intercepted. In response to each interception, the VMM is invoked to emulate the intercepted event and provide an appropriate response.

In some cases, the VMM can cache information related to a particular intercept (especially a frequently occurring intercept). As long as the same underlying instruction is intercepted, the VMM can used the cached data to speed the processing of the intercept. For example, in some cases, a code sequence that performs the needed processing can be saved and can be executed immediately based on detecting the same intercept for the same instruction. However, ensuring that the same instruction has been intercepted can be problematic, especially if the privileged code within the virtual machine can change translations transparent to the VMM (e.g. in nested page table schemes). Typically, software must walk the page tables to ensure that the same translation exists. One suggested solution to the software table walk is an instruction that can specify the virtual address of the instruction and that can verify that the translation still exists in the translation tables. For example, a solution can include an instruction that has a virtual address operand and a physical address operand. The instruction faults if the virtual address does not translate to the physical address, if there is no translation, or if the translation indicates that the page is not executable. Another solution can include an instruction that has the virtual address operand, translates the address, and returns the physical address and the executable flag from the page table as the result (or faults if there is no translation).

SUMMARY

In an embodiment, a processor comprises an execution core configured to execute a first instruction defined in an instruction set architecture implemented by the processor. The first instruction comprises at least a first operand from which the execution core is configured to determine a virtual address. The first instruction further comprises a second operand that specifies one or more translation attributes that exist in a page table entry that defines a translation for the virtual address, excluding the physical address to which the virtual address translates. The execution core comprises translation circuitry configured to translate the virtual address, wherein the translation circuitry is configured to verify that the translation attributes in the page table entry match the specified translation attributes. The translation circuitry is configured to fault the first instruction responsive to failing to locate a translation for the virtual address, and to fault the first instruction responsive to locating a translation for the virtual address in the page table entry but with translation attributes in the entry failing to match the specified translation attributes. The execution core is configured to complete the instruction without a fault responsive to the translation circuit locating the translation and the translation attributes matching the specified translation attributes.

In an embodiment, a method comprises a processor executing a first instruction defined in an instruction set architecture implemented by the processor. The first instruction comprises at least a first operand from which the execution core is configured to determine a virtual address, and a second operand that specifies one or more translation attributes that exist in a page table entry that defines a translation for the virtual address. The one or more translation attributes exclude the physical address to which the virtual address translates. The executing comprises: the processor translating the virtual address; the processor comparing the translation attributes in the page table entry to the specified translation attributes; and the processor faulting the first instruction responsive to locating a translation for the virtual address in the page table entry but with translation attributes in the entry failing to match the specified translation attributes.

In an embodiment, a computer accessible storage medium stores a plurality of instructions including a first instruction. The first instruction comprises at least a first operand from which a virtual address is determined, and a second operand that specifies one or more translation attributes that exist in a page table entry that defines a translation for the virtual address. The one or more translation attributes exclude the physical address to which the virtual address translates. The first instruction, when executed on a processor, causes the processor to: translate the virtual address; verify whether or not the translation attributes in the page table entry match the specified translation attributes; fault the first instruction responsive to failing to locate a translation for the virtual address; and fault the first instruction responsive to locating a translation for the virtual address in the page table entry but with translation attributes in the entry failing to match the specified translation attributes.

BRIEF DESCRIPTION OF THE DRAWINGS

The following detailed description makes reference to the accompanying drawings, which are now briefly described.

FIG. 3 is a block diagram of one embodiment of a page table entry.

FIG. 4 is a block diagram of another embodiment of a page table entry.

Figure 1:
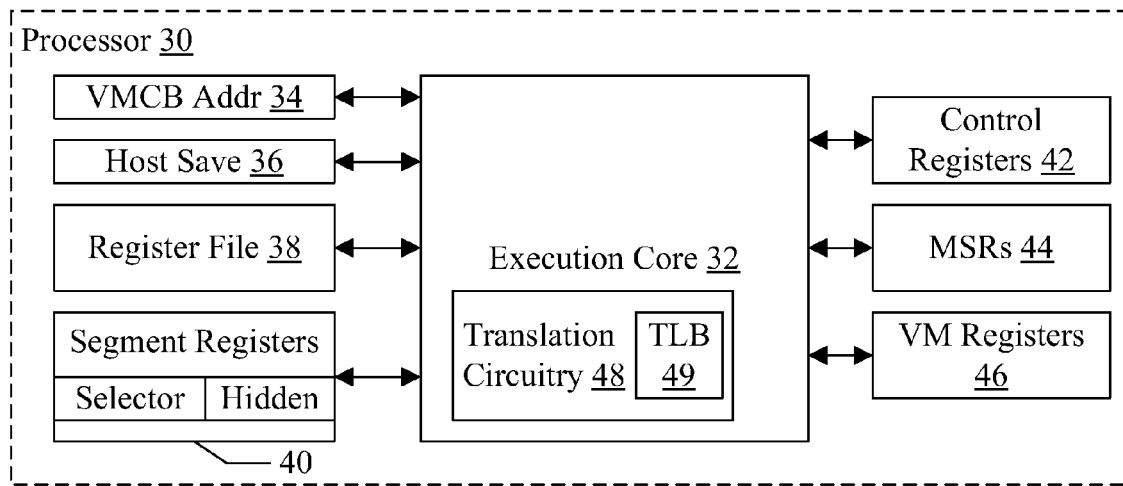
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

In one embodiment, a processor may implement a translate and verify instruction ("XlateV" herein). That is, the instruction set architecture implemented by the processor (which specifies the instructions that a programmer, compiler, or assembler can use in a program provided to the processor for execution) includes the XlateV instruction. The XlateV instruction may include a virtual address operand specifying a virtual address. Alternatively, the XlateV instruction may include two or more virtual address operands that can be combined, e.g. added, to produce the virtual address. The XlateV instruction may further include an attributes operand that the programmer can use to specify one or more attributes of the page table entry that provides the corresponding physical address. The processor may match the specified attributes to corresponding attributes from the page table entry. If the virtual address operand cannot be translated (in the page translation tables in use by the processor), or if one or more of the specified attributes is not matched, the XlateV instruction may fault. If the virtual address can be translated and the specified attributes are matched, the instruction may complete successfully. In one embodiment, the instruction may provide the physical address to which the virtual address translates as a result. In another embodiment, a physical address operand may be provided in the XlateV instruction. The processor may compare the physical address operand to the physical address from the page table entry, and may fault if the physical address does not match (in addition to the above description).

The XlateV instruction may be useable in a variety of fashions. For example, a VMM may use the XlateV instruction to verify an address translation corresponding to an intercepted instruction (e.g. the translation of the fetch virtual address, or program counter (PC) of the instruction to a physical address in the system memory). If the translation is the same as a previous translation during a previous intercept, cached information corresponding to the intercept can be used.

Another use may be for "garbage collectors." Garbage collectors are used to reclaim memory that has been allocated to an application program, but which is no longer actually used by the application program. For example, garbage collection may be used to reclaim memory that is controlled by a dynamic memory allocator. The dynamic memory allocator may receive requests for memory from applications, may allocate the requested memory within its memory region (often called the "heap"), and may return a pointer to the allocated memory to the requesting application. When a garbage collector is operating on a page of memory, the application program needs to be barred from using the page (e.g. a "read barrier" or "write barrier" is needed). The XlateV instruction may be used as part of a read or write barrier function. When a garbage collector is operating on a physical page, the garbage collector may mark the page to indicate the operation (e.g. using one of the "available" bits in the page table entry). The XlateV instruction may be used by the application to detect that the available bit indicates garbage collection, and may fault to prevent the application from accessing the page. Similarly, if a pointer has been reclaimed, the corresponding translation may be marked as not available, and the XlateV instruction may be used to detect that the pointer cannot be used. Because the XlateV instruction can be flexibly configured to test various attributes, the XlateV instruction may provide the programmer with considerable functionality to control the operation of his/her programs. Additionally, by providing an instruction that is defined to check the page table translation data structures, the translation check may be more efficient than if software is manually coded to check the translation table data structures.

Turning now to FIG. 1, a block diagram illustrating one embodiment of a processor 30 that may implement the XlateV instruction is shown. In one embodiment, the processor 30 may be included in host hardware 20 of a computer system shown in FIG. 5 that may support virtualization. In other embodiments, the processor 30 may be included in any system and may implement the XlateV instruction for any purpose (e.g. garbage collection as mentioned above). In the illustrated embodiment, the processor 30 includes an execution core 32, a virtual machine control block (VMCB) address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46. The VMCB address register 34, the host save register 36, and the VM registers 46 may be part of the virtualization hardware used for embodiments that support virtualization via virtual machines. Embodiments that do not support such virtualization (but still support address virtualization via page table translations) may not include the registers 34, 36, and 46.

Generally, the execution core 32 is configured to execute the instructions defined in the instruction set architecture implemented by the processor 30 (e.g. the x86 instruction set architecture, including AMD64™ extensions, in some embodiments). The instructions include the XlateV instruction. The execution core 32 may employ any construction. For example, the execution core 32 may be a superpipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions. The execution core 32 may also include translation circuitry 48 that performs address translation according to an address translation mechanism defined for the processor 30.

Generally, the address translation mechanism includes a set of page tables that can be located by a page table base address. For example, the page tables in the x86 instruction set architecture, including the AMD64™ extensions, include a page table base address register (CR3) that stores the page table base address. The translation circuitry 48 may index into the page tables responsive to the virtual address to be translated. For example, the x86 address translation mechanism accesses the page tables in a hierarchical fashion, indexing based on a first field of the virtual address to obtain a pointer to the next level page table, which is indexed by a second field of the virtual address, etc. until a translation of the virtual address has been located. Other embodiments may hash the virtual address with one or more other values to create an index into the page tables, or use other operations. In one embodiment that supports virtual machine virtualization, the address translation mechanism may include nested paging to support guests in virtual machines. In nested paging, the processor may support a set of page tables for each guest (translating from guest virtual to guest physical addresses) and another set of page tables (translating from guest physical to host physical addresses). Thus, a tablewalk initiated during guest execution may walk two sets of page tables when nested paging is used. In nested paging embodiments, there may be a separate page table base address register for the nested page tables as well.

In one embodiment, the translation circuitry 48 may include a translation lookaside buffer (TLB) 49 configured to cache the results of translations. The TLB may store the portion of the input address that gets translated (guest virtual or guest physical) and the corresponding portion of the resulting translated address (host physical). The portion may be the input/output address with the exception of the least significant bits that form an offset within the page. The page is the unit of translation, and may vary in size. The translation circuit 48 may search the TLB during execution of the XlateV instruction, in addition to the searching performed by the translation circuit 48 for normal translations during execution (e.g. for instruction fetch addresses, or PCs, and for data addresses for load/store instructions or instructions having implicit load/store operations, such as arithmetic/logic instructions having a memory operation in the x86 instruction set). There may be separate instruction and data TLBs for instruction fetch and data address translations, respectively. Additionally, there may be multiple levels of TLBs, similar to cache hierarchies.

When executing a VMRUN instruction to launch a guest (described in more detail below), the execution core 32 may save the address of the VMCB identified by the VMRUN instruction in the VMCB address register 34. Subsequently, during a guest exit, the execution core 32 may save partial processor state to the VMCB indicated by the VMCB address register 34. The host save register 36 may store an address of a host save area in which host processor state (e.g. corresponding to the VMM 18) may be saved. The execution core 32 may save partial processor state in the host save area during execution of the VMRUN instruction, and may load partial processor state from the host save area during a guest exit to the VMM 18.

The register file 38 may comprise various registers defined for use with the instructions that the execution core 32 is configured to execute. For example, the register file 38 may comprise integer registers, floating point registers, multimedia registers, etc. Registers in the register file 38 may be used to store the virtual address operand(s) and the attribute operand of the XlateV instruction.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64™ extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), etc.

The MSRs 44 may comprise one or more registers that are implementation dependent. That is, the instruction set architecture may permit a given implementation to define any set of MSRs 44 that may be desirable for that implementation.

The VM registers 46 comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 1. The VM registers 46 may include registers that may be loaded with virtual interrupt state to permit an interrupt to be injected into a guest. The VM registers 46 may also include an intercepts register or registers. The intercept register or registers may store the intercept configuration. The execution core 32 may be configured to monitor for various intercepts indicated in the intercepts register, and to exit using the exit mechanism as indicated in the intercepts register. The intercepts register may be loaded from the VMCB 22 of a guest when execution of that guest is initiated (e.g. using the VMRUN instruction described above). Other VM registers 46 may be included to virtualize various other processor state, system resources, etc. In some embodiments, some or all of the VM registers 46 may be defined as MSRs.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 2:
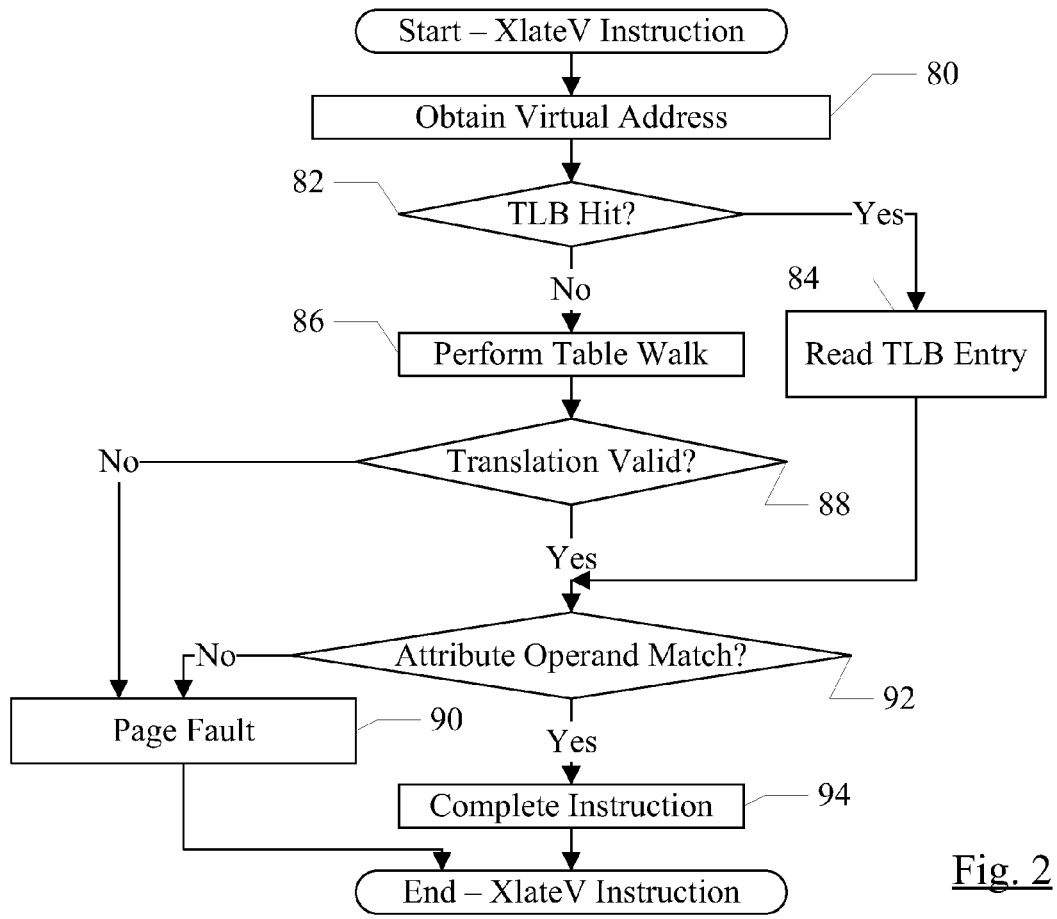
FIG. 2 is a flowchart illustrating operation of one embodiment of the processor to execute a translate and verify instruction.

Turning now to FIG. 2, a flowchart is shown illustrating operation of one embodiment of the processor 30 (and more particularly the execution core 32) to execute one embodiment of the XlateV instruction. For example, the operation of FIG. 2 may be performed in response to issuing the XlateV instruction within the processor 30 for execution. While the blocks are shown in a particular order for ease of understanding, other orders may be used. Blocks may be performed in parallel by combinatorial logic in the processor 30/execution core 32. Blocks, combinations of blocks, and or the flowchart as a whole may be pipelined over multiple clock cycles and/or may be implemented in microcode in the processor 30/execution core 32, in various embodiments.

The processor 30 may obtain the virtual address (block 80). For example, in one embodiment, a register operand may store the virtual address and obtaining the virtual address may include reading the virtual address from the register. In other embodiments, two or more operands may be combined to produce the virtual address. Obtaining the virtual address may include reading the operands and combining the operands in such embodiments (e.g. adding the operands). The translation circuitry 48 may provide the virtual address as an input to the TLB. If the virtual address is a TLB hit (decision block 82, "yes" leg), the processor 30 may read the TLB entry to obtain the translation information (physical address and translation attributes—block 84). If the virtual address is not a hit in the TLB (decision block 82, "no" leg), the translation circuitry 48 may perform a table walk through the page tables (block 86) to obtain a translation. If the translation is not valid (decision block 88, "no" leg), the translation circuitry 48 may signal a page fault, and the processor 30 may begin fetching the page fault handler for execution (block 90).

If the translation is valid (decision block 88, "yes" leg) or the translation was read from the TLB (block 84), the processor 30 may compare the translation attributes from the page table entry (as cached in the TLB, or from the page table in memory if the table walk was performed) to the attribute operand. If one or more attributes do not match the specified attributes in the attribute operand (decision block 92, "no" leg), the translation circuitry 48 may again signal a page fault (block 90). Alternatively, the translation circuitry 48 may signal a different fault for the attribute mismatch case, which may speed the processing of the fault in some embodiments. If the attributes do match the specified attributes (decision block 92, "yes" leg), the XlateV instruction completes successfully (block 94). In one embodiment, the physical address to which the virtual address translates is written to a destination register as the result of the instruction. In another embodiment, a physical address can also be specified as an operand and may be compared to the physical address resulting from the translation to either cause a fault (mismatch) or no fault (match). In one implementation, if the virtual address is a TLB hit but the attributes do not match, the processor 30 may invalidate the TLB entry and may perform a table walk to check the translation. If the translation fails or the attributes do not match from the table walk, the processor 30 may signal the fault. Such an implementation may be used if the instruction set architecture permits a change to a translation to increase permission without requiring an explicit flush command. For example, the x86 instruction set architecture permits such changes without a flush.

Generally, a translation attribute may be any attribute in the page table entry other than the physical address. The translation attribute may control an aspect of the processor's access to the page (e.g. indicating whether it is readable, writeable, and/or executable; cache characteristics such as cacheable or non-cacheable and writethrough or writeback; etc.). In one embodiment, the translation attribute may also include the available bits in the page table entry that can be used by software to communicate values.

The attribute operand may be specified in any desired fashion. The attribute operand may be a register operand, an immediate field, etc. For example, in one embodiment, a 64 bit register could be divided into 7 bit fields (with one spare bit). Each 7 bit field could be coded with a bit number (6 bits for a 64 bit page table entry) identifying a bit to be selected from the page table entry, and a bit indicating the desired state (set or clear) to be matched by the selected bit. Such a configuration would permit up to 9 translation attributes to be tested. Alternatively, translation attribute bits from the PTE could be assigned to bits of a bit vector, and the operand may comprise two bit vectors. One bit vector could indicate bits to be tested for a set state (or not tested), and the other bit vector could indicate bits to be tested for a clear state (or not tested). In yet another alternative, two bits in the translation attribute operands could be assigned to each translation attribute, which could be encoded to indicate test for set, test for clear, and don't care (no test).

It is noted that the XlateV instruction may not generate a memory access to the physical address that results from the translation (as opposed, e.g., to a load or store operation which implicitly includes a translation but also accesses the physical address resulting from the translation). In some embodiments that implement virtualization for virtual machines and that support the alternate address space as described below, the XlateV instruction may default to translating through the alternate address space. In some embodiments, the default may be overridden (e.g. with a segment override prefix byte) so that the XlateV instruction translates through the current address space.

FIGS. 3 and 4 illustrate exemplary page table entries and translation attributes that can be included in the entry. FIGS. 3 and 4 are only exemplary, however, and any page table entry format may be used in various embodiments. A set of page tables comprises a plurality of page table entries located by the page table base address.

Turning now to FIG. 3, a block diagram of an embodiment of a page table entry 74 which may be used in one embodiment of the processor 30 is shown. The page table entry 74 may be compatible with the extended page table entries defined in the x86 instruction set architecture.

Generally, the entry 74 includes an address (either of the page to which the virtual address maps, or to another set of page table entries that are indexed by additional virtual address bits to select another entry 74 in the hierarchical paging mechanism defined in x86), and some of the least significant bits of the address field may be required to be zero or may be ignored, depending on the page size. Additionally, some fields are available for software use (labeled "available" and "AVL" in FIG. 3), an EPT page type is defined, and the execute (X), write (W), and read (R) bits are included as shown in FIG. 3. The available for software bits, the EPT page type, and the X, W, and R bits may all be translation attributes that can be tested by the XlateV instructions. The X, W, and R bits define the access to the page indicated by the address field. Specifically, if the X bit is set, execution is permitted from the page and if the X bit is clear, execution is not permitted from the page. Similarly, if the W bit is set, writes are permitted to the page and if the W bit is clear, writes are not permitted to the page; and if the R bit is set, reads are permitted to the page and if the R bit is clear, reads are not permitted to the page. Accordingly, if all three bits are clear, the page is not present. Some encodings may not be supported and may cause a page fault. For example, write only and execute/write may not be supported, in some embodiments.

Turning now to FIG. 4, a block diagram of another embodiment of a page table entry 70 which may be used in one embodiment of the processor 30 is shown. The page table entry 70 may be compatible with the page table entries defined in the x86 instruction set architecture when physical address extension (PAE) is enabled in the processor.

The entry 70 includes a no execute (NX) bit, available for software bits ("available" and "AVL"), a global page bit (G), a page attribute table bit (PAT), a dirty bit (D), an accessed bit (A), a page-level cache disable bit (PCD), a page-level writethrough bit (PWT), a user/supervisor bit (U/S), a read/write bit (R/W), and a present bit (P). The present bit is essentially a valid bit for the entry 70, indicating whether or not the entry is present in the page tables. The present bit is also a defacto read bit, indicating that the page identified by the address field is readable. The R/W bit indicates whether or not the page is writeable or read-only. The NX bit indicates whether or not instruction execution is permitted in the page. The G bit indicates whether or not the page is global, and thus exists in each page table. Global pages need not be invalidated in the TLB when the page table base address register is changed. The PAT bit is used to index a PAT register. The D bit indicates whether or not the page has been written. The A bit indicates whether or not the page has been read. The PCD bit controls cacheability for the page, and the PWT controls writethrough or writeback for the page. Additionally, the PCD and the PWT bit are used in conjunction with the PAT bit to index the PAT register. The U/S bit indicates if the page is restricted to supervisor (privileged) access, or if user access is permitted.

As mentioned previously, the address field (bits 51 to 12, in the embodiment of FIG. 4) may store an address of the page identified by the entry 70. In one embodiment, the page table entry 70 may be part of a hierarchical paging scheme in which a first level of the page tables is accessed based on the most significant bits of the virtual address and the page table base address, and the corresponding address field in the page table entry identifies the next level of the page tables and additional virtual address bits are used to identify a page table entry in the second level, etc., until all translated virtual address bits have been used. The number of levels depends on the page size as well as the number of virtual address bits. In one embodiment, various page sizes may be supported depending on different processor modes. For example, a 4 kilobyte page size, a 2 Megabyte page size, a 4 Megabyte page size, and a 1 Gigabyte page size may be supported in various embodiments. Other embodiments may support any page size or any combination of page sizes. The address field supports as small as a 4 kilobyte page size. If larger page sizes are used, some of the least significant bits of the address field may be don't cares or may be required to be zero.

Virtualization Example

Figure 5:
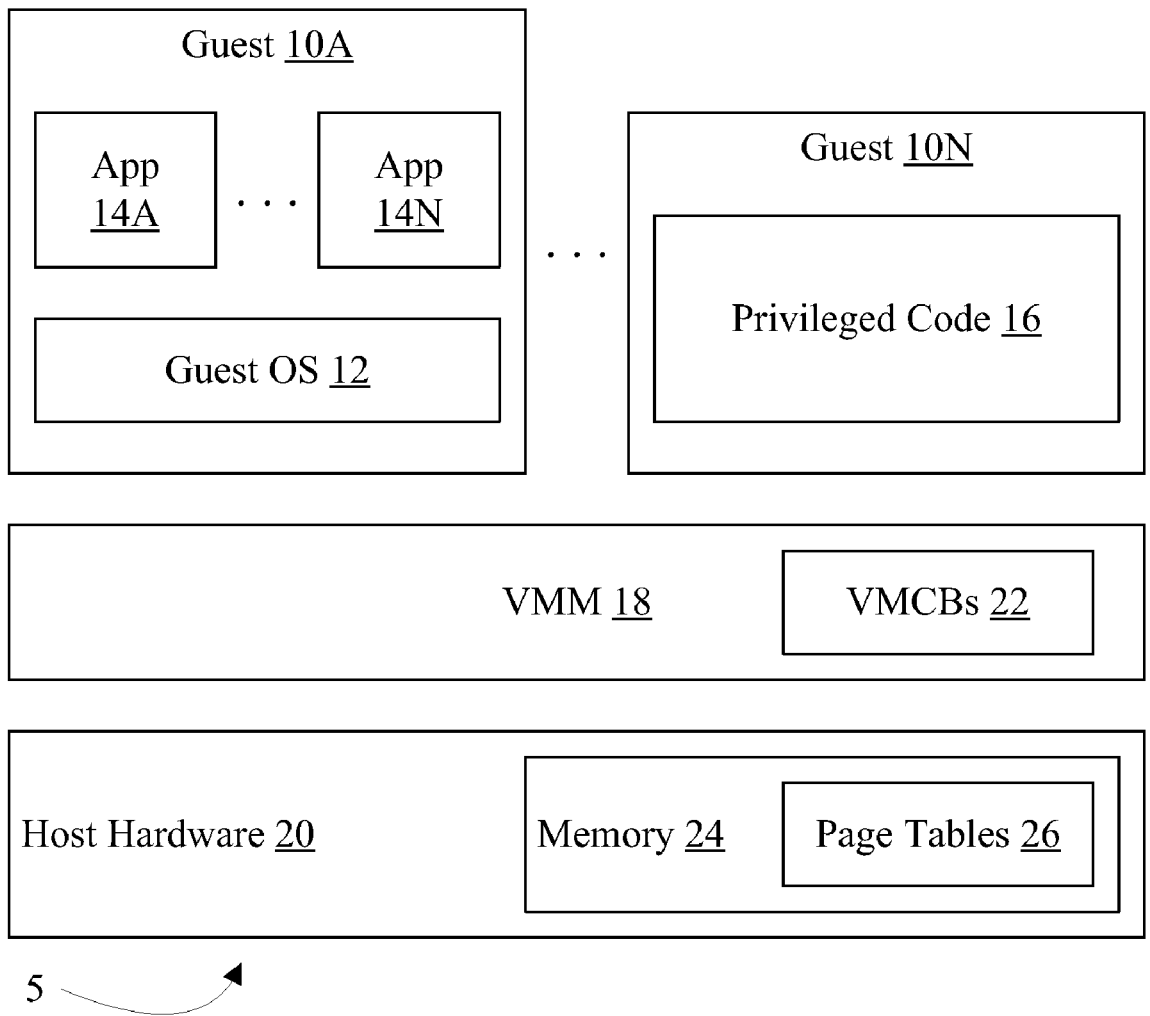
FIG. 5 is a block diagram of one embodiment of a computer system that implements virtualization.

Turning now to FIG. 5, a block diagram of one embodiment of a computer system 5 that implements virtualization is shown. In the embodiment of FIG. 5, multiple guests 10A-10N are shown. Guest 10A includes a guest operating system (OS) 12 and one or more applications 14A-14N that run on the guest OS 12. Guest ION includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors such as processor 30, memory, peripheral devices, and other circuitry used to couple the preceding components. For example, common personal computer (PC)-style systems may include a Northbridge coupling the processors, the memory, and a graphics device that uses the advanced graphics port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used. As illustrated in FIG. 5, the host hardware 20 may include a system memory 24, which may store one or more page tables 26 during use (e.g. shadow page tables, guest page tables, nested page tables, etc.).

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event or at least executes VM-controlled code in response to the intercepted event, even if the guest is not exited to the VMM 18. In one embodiment, the intercept configuration may include a second set of indications which indicate which of two exit mechanisms is used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event. In another embodiment, the first set of intercept indications may indicate which intercept events are to be intercepted and the second set of intercept indications may indicate which exit mechanism to use for each intercept.

Generally, the exit mechanism may define the operations performed by the processor to exit guest execution (generally in a restartable fashion) and to begin executing other code. In one embodiment, one exit mechanism may include saving a small amount of processor state and loading state for a minivisor. The minivisor may execute "near" the guest, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp. (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

In one embodiment, the processor(s) in the host hardware 20 may support an alternate address space when the VMM code (e.g. the VMM 18 and/or the minivisor, in embodiments that implement the minivisor) is being executed. The alternate address space may be the virtual address space of the guest which has most recently exited. Accordingly, if the VMM code needs to access memory that is accessed by the guest, the VMM code need not include instructions to locate the guest's page tables, process the page tables ("walk" the page tables) to identify the translation, walk the nested page tables (where implemented) and read the resulting physical address in memory. Instead, the VMM code may include an instruction that specifies the alternate address space for the access and the translation hardware may automatically translate the address through the page tables indicated by the alternate address space (e.g. the guest's page tables). Performance of the VMM code may be improved.

Figure 6:
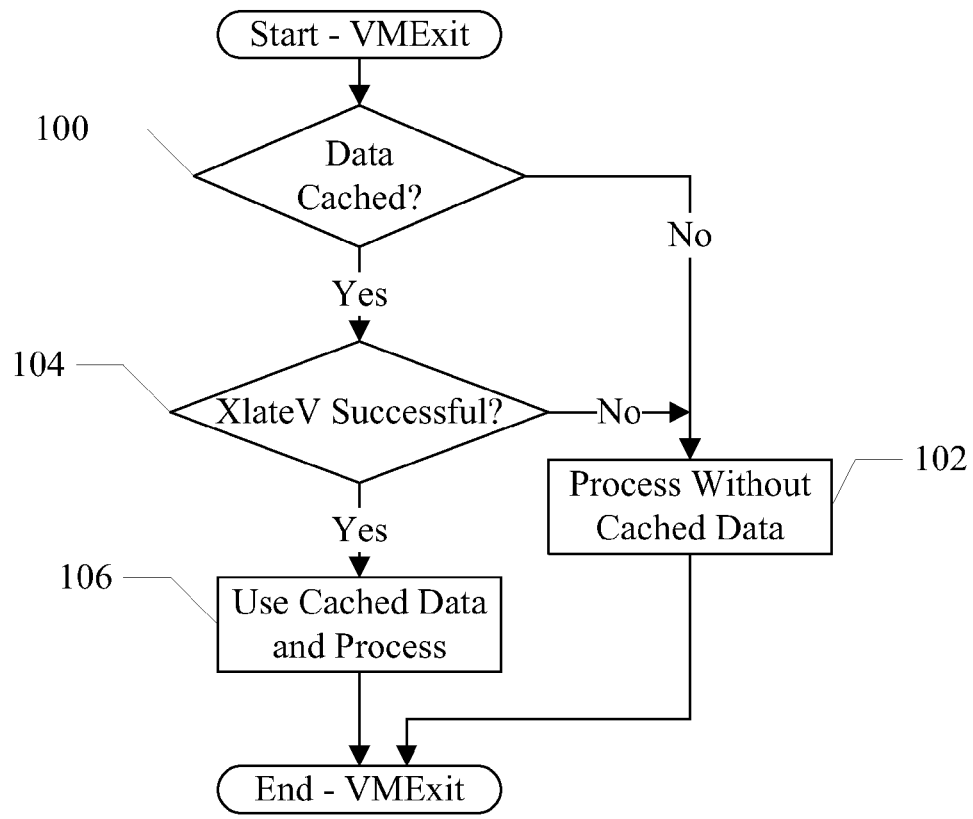
FIG. 6 is a flowchart illustrating one embodiment of processing a VMExit using a translate and verify instruction.

Turning now to FIG. 6, a flowchart is shown illustrating operation of one embodiment of the VMM 18 (or the minivisor, in embodiments that implement the minivisor) in response to an exit from a guest. While the blocks are shown in a particular order for ease of understanding, other orders may be used. The VMM 18/minivisor may comprise instructions which, when executed, implement the operation shown in FIG. 6.

The VMM 18 may determine if there is data cached by the VMM 18 that may be used to speed processing of the intercept (decision block 100). For example, the VMM 18 may cache a code sequence the performs the desired operation, located in the cache at least in part by the virtual PC of the intercepted instruction (or a portion of the virtual PC). The cached code sequence may eliminate the analysis portion of emulating the intercepted instruction (assuming that the same instruction has been intercepted) and may include only the instructions that emulate the desired operations. Alternatively, other data may be cached that may be used by a predefined handler routine to perform the desired operation (e.g. identification of the type of instruction to be emulated, information regarding the operating environment within the guest, etc.). Again, the data may be identified in the cache, at least in part, by the virtual PC of the intercepted instruction (or a portion of the virtual PC).

If there is no data cached for the intercept (decision block 100, "no" leg), the VMM 18 may continue processing the intercept without any cached data (block 102). On the other hand, if there is data cached for the intercept (decision block 100, "yes" leg), the VMM 18 may used the XlateV instruction to ensure that the translation for the virtual PC has not been changed by the guest (decision block 104). For example, with nested page tables, the guest controls the guest virtual to guest physical translation. The VMM 18 controls the guest physical to host physical translation in the nested page table. If the guest has changed the guest virtual to guest physical translation, it is possible that a different instruction has been intercepted for a given guest virtual PC. In some cases, the VMM 18 may accept a successful translation of the guest virtual PC to an executable page (specified by the translation attribute operand) as "proof" that the translation has not changed. In other cases, the VMM 18 may record the host physical address to which a guest PC translates and may verify the host physical address via the XlateV instruction (or by comparing the XlateV result to the recorded physical address using a subsequent instruction, if the host physical address is returned as a result of the XlateV instruction).

If the XlateV executes successfully (without experiencing a fault) (decision block 104, "yes" leg), the VMM 18 may process the intercept using the cache data (block 106). Otherwise (decision block 104, "no" leg), the VMM 18 may process the intercept without the cached data (block 102).

Garbage Collection Example

Figure 7:
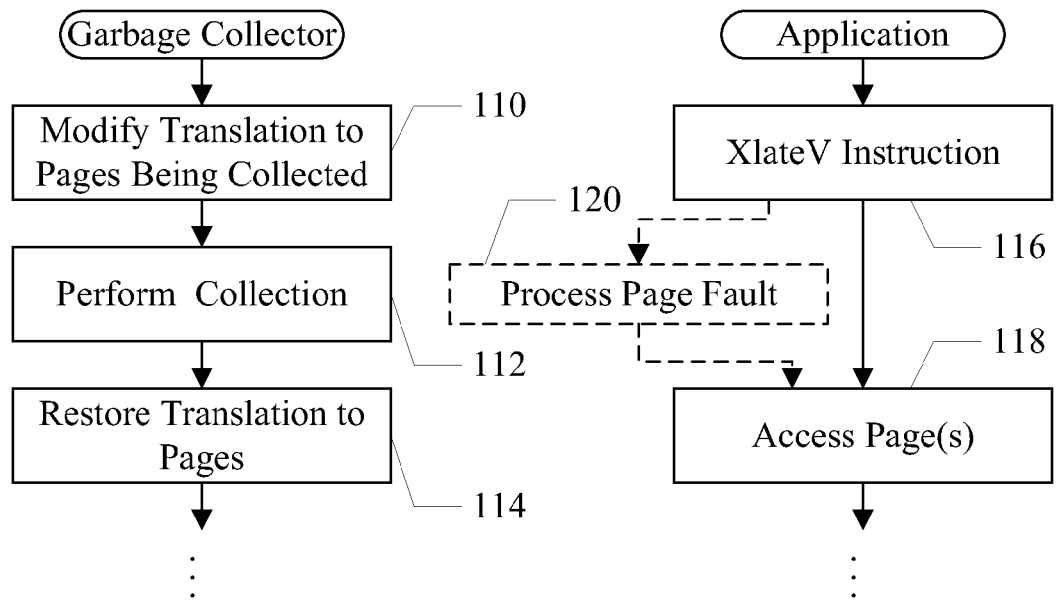
FIG. 7 is a pair of flowcharts illustrating one embodiment of garbage collection and an application, illustrating another use of the translate and verify instruction.

Turning now to FIG. 7, a pair of flowcharts are shown illustrating operation of one embodiment of a garbage collector (left flowchart) and a corresponding application (right flowchart) for one embodiment. While the blocks are shown in a particular order for ease of understanding, other orders may be used. The garbage collector or application may comprise instructions which, when executed, implement the operation shown in FIG. 7.

The garbage collector may be invoked periodically to perform the garbage collection, or may be invoked when the memory available to be allocated falls below a certain threshold, for example. When invoked, the garbage collector may begin scanning the allocation memory region for memory that can be reclaimed. When the garbage collector begins operating within a given page, the garbage collector may modify the translation(s) in the various page tables that translation virtual addresses to the given page, the garbage collector may modify the translation to indicate the operation (block 110). For example, the garbage collector may use the software-available bits to provide an encoding that indicates garbage collection. Applications may be required to respect the encoding in the software-available bits by not accessing the page. The garbage collector may perform the collection (block 112), and may restore the translation to the pages (block 114). In one embodiment, the restoring of the translation may comprise removing the encoding to permit the application to access the page. In another embodiment, restoring the encoding may comprise changing the encoding to a different encoding that the application can recognize as indicating that garbage collection has been performed, but is complete. Such an encoding may cause the application to check its pointers for validity, for example.

In some embodiments, the garbage collector may operate within one or a few pages at a time, and may modify the translations only to those pages. After completing the pages, the garbage collector may restore the translations to those pages and select the next pages to operate on (using blocks 110, 112, and 114 for the next set as well). The operation of blocks 110, 112, and 114 may be iterated on each selected set of pages until all pages are processed, until a desired amount of memory has been freed, or until any other garage collection termination condition has been reached.

The application may use the XlateV instruction to check the translation to a page that has been allocated and might be garbage collected (block 116). For example, the XlateV instruction may be executed with the virtual address operand (pointer) to a page that has been allocated and might be garbage collected, and the translation attribute operand may be coded to check the software available bits for an encoding indicating that no garbage collection has been performed. Multiple XlateV instructions may be used if there is more than one allocated page. The application may follow the XlateV instruction(s) with instructions that access the allocated pages (block 118). If a page fault occurs during execution of one of the XlateV instructions (dotted line to block 120), the application may process the page fault by, e.g., waiting for the translation to be changed to indicate that garbage collection has completed and then checking the pointers within the page again; or determining that memory has been reclaimed and requesting new memory to be restored to the values that were stored in the reclaimed memory (e.g. by reexecuting the code from a point prior to writing values to the reclaimed memory). If the page fault code is able to determine that that pages are available for access or is able to recover any reclaimed memory, the processing may continue with the instructions that access the page(s) (dotted line from block 120 to block 118).

Accordingly, for the more common case that garbage collection has not been performed in the pages to be accessed by the application, the application may rapidly move onto processing the instructions that access the pages. Correct operation (or at least prevention of incorrect operation) may be provided via the page fault and fault handler execution.

It is noted that the garbage collection example need not be implemented within the virtual machine configuration illustrated in FIG. 5. Instead, for example, the garbage collector and the application may execute on an operating system that directly controls the host hardware. Alternatively, the garbage collection example may be implemented within a virtual machine, if desired.

Figures 8, 9:
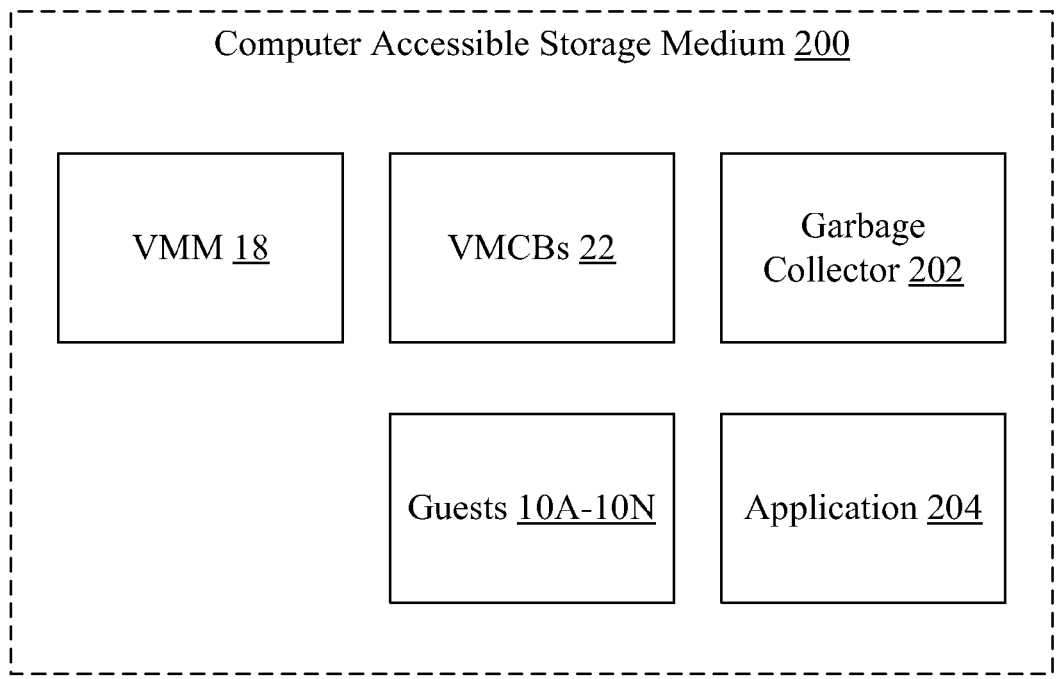
FIG. 8 is a block diagram of one embodiment of a translate and verify instruction.
FIG. 9 is a block diagram of one embodiment of a computer accessible storage medium.

FIG. 8 is a block diagram of one embodiment of an XlateV instruction 210. The embodiment may include an opcode 212 that differentiates the XlateV instruction from other instructions in the instruction set architecture implemented by the processor 30, a translation attribute operand specifier 214, one or more virtual address operand specifiers 216, and an optional physical address operand specifier 218. Each operand specifier 214, 216, and 218 specifies the location of the corresponding operand. For example, operand specifiers may comprise a register address that identifies a register from which the operand should be read. Operand specifiers may further include immediate fields and/or displacement fields. As mentioned previously, in some embodiments, the XlateV instruction may default to accessing the alternate address space. In such embodiments, the XlateV instruction 210 may also optionally include a segment override prefix to override the default and use the current address space.

Turning now to FIG. 9, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, Blu-Ray disk, HD-DVD disk, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. The computer accessible storage medium 200 in FIG. 9 may store one or more of the VMM 18, one or more VMCBs 22, a garbage collector 202 guests 10A-10N, and/or an application 204. The VMM 18 may comprise instructions which implement the operations described for the VMM 18 herein. For example, the VMM 18, when executed, may implement the operation shown in FIG. 6. The garbage collector 202 may comprise instructions which implement the operations described for the garbage collector herein (e.g. with regard to FIG. 7). The application 204 may comprise instructions which implement the operations described for the application herein (e.g. with regard to FIG. 7). The computer accessible storage medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising a processor executing a first instruction defined in an instruction set architecture implemented by the processor, wherein the first instruction comprises at least a first operand from which the processor is configured to determine a virtual address, and wherein the first instruction comprises a second operand that specifies one or more translation attributes, wherein the one or more translation attributes specified by the second operand exclude a physical address to which the virtual address translates, and wherein the executing comprises:
   the processor translating the virtual address;
   the processor comparing the specified one or more translation attributes to one or more translation attributes in a page table entry that defines a translation for the virtual address; and
   the processor faulting the first instruction responsive to locating the translation for the virtual address in the page table entry but with the one or more translation attributes in the entry failing to match the specified one or more translation attributes.

2. The method as recited in claim 1 further comprising executing a second instance of the first instruction, wherein executing the second instance comprises:
   the processor failing to locate a translation for a virtual address specified by the second instance; and
   the processor faulting the second instance responsive to failing to locate the translation for the virtual address specified by the second instance.

3. The method as recited in claim 1 further comprising executing a second instance of the first instruction, wherein executing the second instance comprises:
   the processor translating the virtual address for the second instance;
   the processor comparing the one or more translation attributes in the page table entry to the specified one or more translation attributes corresponding to the second instance; and
   the processor completing the second instance of the first instruction without a fault responsive to a translation circuit locating the translation and the one or more translation attributes in the page table entry matching the specified one or more translation attributes corresponding to the second instance.

4. The method as recited in claim 1 wherein the translating comprises checking for a hit in a translation lookaside buffer, and wherein the comparing is performed responsive to data stored in the translation lookaside buffer responsive to detecting a hit.

5. The method as recited in claim 4 wherein the translating further comprises:
   walking one or more page tables in a system memory to which the processor is coupled during use; and
   reading the one or more translation attributes from the page table entry that provides the translation to compare to the specified one or more translation attributes.

6. The method as recited in claim 1 wherein the executing further comprises the processor writing the physical address to which the virtual address translates to a destination of the first instruction.

7. The method as recited in claim 1 wherein the first instruction further comprises a third operand that specifies a physical address, and wherein the executing further comprises:
   comparing the physical address to which the virtual address translates to the specified physical address; and
   faulting the first instruction responsive to the physical address to which the virtual address translates not matching the specified physical address.

8. A computer accessible storage medium storing a plurality of instructions including a first instruction that comprises at least a first operand from which a virtual address is determined, and wherein the first instruction comprises a second operand that specifies one or more translation attributes, wherein the one or more translation attributes specified by the second operand exclude a physical address to which the virtual address translates, and wherein the first instruction, when executed on a processor, causes the processor to:
   attempt to translate the virtual address;
   verify whether or not the specified one or more translation attributes match one or more translation attributes in a page table entry that defines a translation for the virtual address;
   fault the first instruction responsive to failing to locate the translation for the virtual address; and fault the first instruction responsive to locating the translation for the virtual address in the page table entry but the one or more translation attributes in the page table entry fail to match the specified one or more translation attributes.

9. The computer accessible storage medium as recited in claim 8 wherein the first instruction, when executed on the processor, further causes the processor to complete the first instruction without a fault responsive to locating the translation and the one or more translation attributes in the page table entry matching the specified translation attributes.

10. The computer accessible storage medium as recited in claim 8 wherein the first instruction further comprises a third operand that specifies a physical address, and wherein the first instruction, when executed on the processor, further causes the processor to fault the first instruction responsive to the physical address to which the virtual address translates not matching the specified physical address.

11. The computer accessible storage medium as recited in claim 8 wherein the plurality of instructions comprise additional instructions which, when executed, use data cached during a previous execution responsive to the first instruction completing without a fault.

12. The computer accessible storage medium as recited in claim 8 wherein the plurality of instructions comprise additional instructions which access the physical address to which the virtual address translates responsive to the first instruction completing without a fault.

13. A processor comprising:
an execution core configured to execute a first instruction defined in an instruction set architecture implemented by the processor, wherein the first instruction comprises:
at least a first operand from which the execution core is configured to determine a virtual address, and
a second operand that specifies one or more translation attributes, wherein the one or more translation attributes specified by the second operand exclude a physical address to which the virtual address translates; and
the execution core comprises translation circuitry configured to translate the virtual address, wherein the translation circuitry is configured to verify that the specified one or more translation attributes match one or more translation attributes in a page table entry that defines a translation for the virtual address, and wherein the translation circuitry is configured to fault the first instruction responsive to locating the translation for the virtual address in the page table entry but with the one or more translation attributes in the page table entry failing to match the specified one or more translation attributes, and wherein the execution core is configured to complete the first instruction without a fault responsive to the translation circuit locating the translation and the one or more translation attributes in the page table entry matching the specified one or more translation attributes.

14. The processor as recited in claim 13 wherein the translation circuitry comprises a translation lookaside buffer, and wherein the translation circuitry translating the virtual address comprises checking for a hit in the translation lookaside buffer, and wherein the translation circuit verifying translation attributes is performed responsive to data stored in the translation lookaside buffer if a hit is detected.

15. The processor as recited in claim 14 wherein the translation circuitry is configured to walk one or more page tables in a system memory to which the processor is coupled during use to translate the virtual address, wherein the translation circuitry is configured to read the one or more translation attributes in the page table entry that provides the translation to verify with the specified one or more translation attributes.

16. The processor as recited in claim 13 wherein the execution core is configured to write the physical address to which the virtual address translates to a destination of the first instruction.

17. The processor as recited in claim 13 wherein the first instruction further comprises a third operand that specifies a physical address, and wherein the translation circuitry is configured to fault the first instruction responsive to the physical address to which the virtual address translates not matching the specified physical address.

18. The processor as recited in claim 13 wherein the first operand is a single operand that specifies the virtual address.

19. The processor as recited in claim 13 wherein the first operand is one of two or more operands, wherein values specified by the two or more operands are combined to generate the virtual address.

* * * * *